US 9,425,688 B2

(12) United States Patent
Ouyang et al.

(10) Patent No.: US 9,425,688 B2
(45) Date of Patent: Aug. 23, 2016

(54) CONVERTER CIRCUIT AND ASSOCIATED METHOD

(75) Inventors: Qian Ouyang, Hangzhou (CN); Wei Yuan, Hangzhou (CN)

(73) Assignee: Chengdu Monolithic Powers Systems Co., Ltd., Chengdu (CN)

( * ) Notice: Subject to any disclaimer, the term of this patent is extended or adjusted under 35 U.S.C. 154(b) by 138 days.

(21) Appl. No.: 13/572,558

(22) Filed: Aug. 10, 2012

(65) Prior Publication Data

US 2013/0038301 A1    Feb. 14, 2013

(30) Foreign Application Priority Data

Aug. 12, 2011 (CN) .......................... 2011 1 0233799

(51) Int. Cl.
*H02M 3/156* (2006.01)
*H02M 1/00* (2006.01)

(52) U.S. Cl.
CPC ...... *H02M 3/156* (2013.01); *H02M 2001/0016* (2013.01); *H02M 2001/0025* (2013.01)

(58) Field of Classification Search
CPC ..................... H02M 3/156; H02M 2001/0016; H02M 2001/0019; H02M 2001/0025; H02M 3/157; H02M 3/158; H02M 2001/0032
USPC ......... 323/271, 282–285, 288, 299, 351, 242, 323/326
See application file for complete search history.

(56) References Cited

U.S. PATENT DOCUMENTS

| 5,949,229 | A  | * | 9/1999  | Choi ................... H02M 1/4225 323/222 |
| 7,145,317 | B1 | * | 12/2006 | Shah .............................. 323/288 |
| 7,453,246 | B2 | * | 11/2008 | Qiu et al. ...................... 323/282 |
| 7,453,250 | B2 | * | 11/2008 | Qiu et al. ...................... 323/288 |
| 7,471,133 | B1 | * | 12/2008 | Moussaoui et al. ........... 327/172 |
| 7,764,054 | B1 | * | 7/2010  | Guo et al. ..................... 323/224 |
| 7,800,352 | B2 | * | 9/2010  | Qiu et al. ...................... 323/284 |
| 7,868,600 | B2 | * | 1/2011  | Qiu et al. ...................... 323/282 |
| 2007/0013356 | A1 | * | 1/2007  | Qiu et al. ...................... 323/288 |
| 2011/0187341 | A1 | * | 8/2011  | Chiu ....................... G05F 1/618 323/285 |
| 2012/0001603 | A1 |   | 1/2012  | Ouyang et al. |
| 2012/0038331 | A1 | * | 2/2012  | Wu et al. ....................... 323/235 |
| 2012/0062144 | A1 |   | 3/2012  | Yao et al. |
| 2012/0146594 | A1 | * | 6/2012  | Kobayashi .................... 323/234 |
| 2012/0229113 | A1 | * | 9/2012  | Houston et al. ............... 323/288 |

* cited by examiner

*Primary Examiner* — Timothy J Dole
*Assistant Examiner* — Ivan Laboy Andino
(74) *Attorney, Agent, or Firm* — Perkins Coie LLP

(57) ABSTRACT

A converter control circuit for converting an input voltage to an output voltage comprises: an error amplifier, coupled to an output voltage or a feedback output signal from the output voltage, and a reference signal, operable to generate an error signal accordingly; a ramp signal generator, generating a first ramp signal and a second ramp signal; a first comparator, coupled to the error signal and the first ramp signal, operable to generate a first comparing signal accordingly; a second comparator, coupled to the error signal and the second ramp signal, operable to generate a second comparing signal accordingly; and a control signal generator, coupled to the first comparing signal and the second comparing signal, operable to generate a control signal to turn switches in the converter circuit ON and OFF accordingly.

14 Claims, 8 Drawing Sheets

CONVERTER CIRCUIT AND ASSOCIATED METHOD

CROSS-REFERENCE TO RELATED APPLICATION(S)

This application claims the benefit of CN application No. 201110233799.5, filed on Aug. 12, 2011, and incorporated herein by reference.

TECHNICAL FIELD

The present invention generally relates to circuit, and more particularly but not exclusively relates to converter circuit and associated method.

BACKGROUND

Constant on time direct current to direct current (DC-DC) converters are widely applied for their excellent transient response performance and simple internal structure.

Conventionally, certain requirements should be satisfied to make the constant on time converter circuit operate in steady status. For an instance, the feedback ripple should be large enough and in-phase with output inductor current. Such requirements result that ceramic capacitor, despite its low price and small size, could not be applied as output capacitor. Rather, solid capacitor with relatively high price is applied as output capacitor.

SUMMARY

The embodiments of the present invention disclose a converter control circuit and associated method to solve the stability issue existing in the prior constant on time converter, and to obtain a better transient response.

The control circuit comprises an error amplifier, coupled to an output voltage or a feedback output signal from the output voltage, and a reference signal, operable to generate an error signal accordingly; a ramp signal generator, generating a first ramp signal and a second ramp signal; a first comparator, coupled to the error signal and the first ramp signal, operable to generate a first comparing signal accordingly; a second comparator, coupled to the error signal and the second ramp signal, operable to generate a second comparing signal accordingly; and a control signal generator, coupled to the first comparing signal and the second comparing signal, operable to generate a control signal to turn switches in the converter circuit ON and OFF accordingly.

Some embodiments of the present invention further disclose a method for controlling a converter circuit, comprising amplifying an error between an output voltage or a feedback output voltage of the converter circuit, and a reference signal, configured to obtain an error signal; generating a first ramp signal and a second ramp signal; comparing the error signal with the first ramp signal to obtain a first comparing signal; comparing the sum of the error signal and an offset voltage with the second ramp signal to obtain a second comparing signal; and generating a control signal to control switches of the converter circuit according to the first comparing signal and the second comparing signal.

BRIEF DESCRIPTION OF THE DRAWINGS

Non-limiting and non-exhaustive embodiments are described with reference to the following drawings. The drawings are not depicted to scale and only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The term "on time" hereby and in the following text indicates the duration of the primary switch (high side switch in certain embodiments) in a converter turning on in a single operational cycle. The term "off time" hereby and in the following text indicates the duration of the primary switch turning off in a single operational cycle.

Figure 1:
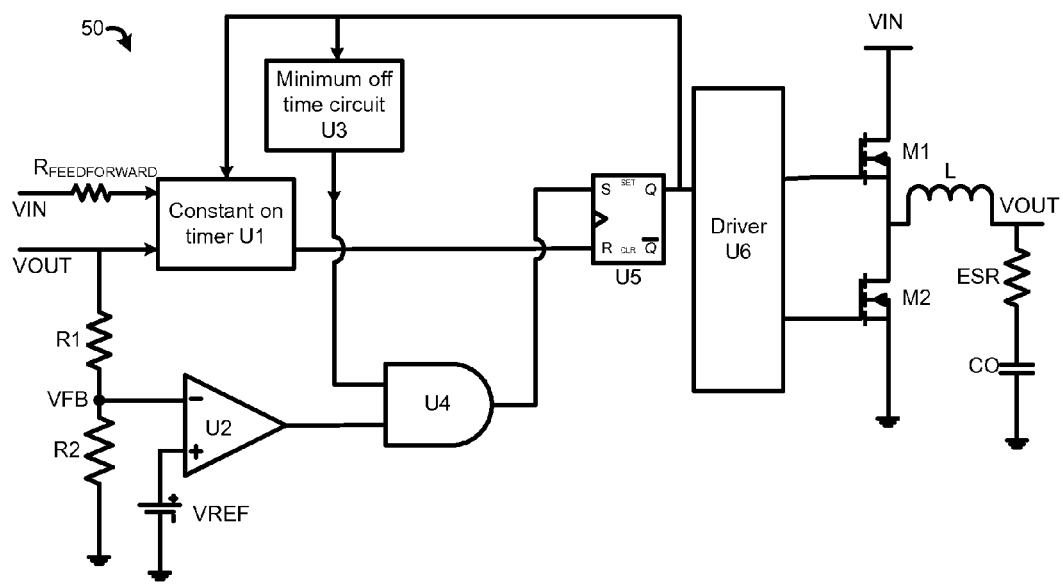
FIG. 1 illustrates a schematic circuitry diagram of a prior art constant on time converter circuit 50.

FIG. 1 illustrates a schematic circuit diagram of a prior art constant on time converter circuit 50.

As shown in FIG. 1, through a forward feedback resistor $R_{FEEDFORWARD}$, a constant on timer U1 receives an input voltage VIN and an output voltage VOUT from converter circuit 50. In one embodiment, resistors R1 and R2 are coupled in series between the output voltage VOUT and a reference ground to comprise a feedback loop. The feedback loop is configured to obtain a feedback signal VFB (the voltage level on the common node of the resistors R1 and R2)

from the output voltage VOUT. The feedback signal VFB is provided to an inverting input of a comparator U2. In another embodiment, the feedback loop may be omitted so that the output voltage VOUT is directly provided to the inverting input of the comparator U2. A non-inverting input of the comparator U2 is coupled to a reference signal VREF. An output of the comparator U2 is coupled to a first input of an AND gate U4. An output of the AND gate U4 is coupled to a set terminal S of an RS flip-flop U5. A reset terminal R of the RS flip-flop U5 is coupled to an output of the constant on timer U1. An output Q of the RS flip-flop U5 is coupled to an input of a driver U6, and further feedbacks to the constant on timer U1 and a minimum off time circuit U3.

The minimum off time circuit U3 receives the output Q of the RS flip-flop U5, and the output of minimum off time circuit U3 is coupled to a second input of AND gate U4. The driver U6 generates two control signals respectively for a high side switch M1 and a low side switch M2. The switches M1 and M2 may be bipolar junction transistor (BJT), metal oxide semiconductor field effect transistor (MOSFET) or other suitable device. The two control signals from driver U6 are coupled to control terminals of switches M1 and M2 respectively. Between the common node of switches M1 and M2, and the reference ground, an output inductor L, a resistor ESR, an ideal output capacitor CO are coupled in series, wherein ESR is the practical equivalent series resistor of the ideal output capacitor CO. The output voltage VOUT of converter circuit 50 is obtained between the output inductor L and the resistor ESR.

When the converter circuit 50 is operating, if the feedback signal VFB is lower than the reference signal VREF, the output of comparator U2 is high. At this time, if the output of minimum off time circuit U3 is also high, the AND gate U4 provides a high level signal to the set terminal of RS flip-flop U5, resulting the "setting" of RS flip-flop U5. The voltage level of the output Q is high to turn on the high side switch M1 and to turn off the low side switch M2 through the driver circuit U6. Thus the output voltage VOUT of converter circuit 50 rises up. Once the output voltage VOUT makes the feedback signal VFB higher than the reference signal VREF, the comparator U2 generates a low level output, and the voltage level of the set terminal of the RS flip-flop U5 is low. The output Q of RS flip-flop U5 is maintained. Meanwhile, the high level output Q triggers the constant on timer U1 to begin timing. After a predetermined time, for example, $$N \times \frac{VIN}{VOUT},$$

the output terminal of constant on timer U1 provides a high level signal to the reset terminal of the flip-flop U5 to reset the RS flip-flop U5. The voltage level of output Q flops to low level. Through the driver circuit U6, the low level output Q turns off the high side switch M1 and turns on the low side switch M2. Consequently the output voltage VOUT of converter circuit 50 declines down.

Moreover, the low level output Q is also provided to the minimum off time circuit U3, and makes the minimum off time circuit U3 generate a low level signal to the AND gate U4 to indicate to minimum duration of the off time of high side switch M1. Therefore, during this minimum off time, the other input of AND gate U4 is disabled. No matter the output of comparator U2 is at high level or low level, the output of AND gate U4 is always low. Once the feedback signal VFB declines down to a level lower than reference signal VREF again, the output of comparator turns to high level. After the minimum off time, the circuit U3 also provides a high level signal to the input of AND gate U4. Accordingly, the output of AND gate U4 is high and sets the RS flip-flop U5. The converter circuit 50 enters into next operational cycle.

According to the above description, the constant on timer U1, the minimum off time circuit U3, the AND gate U4 and the RS flip-flop U5 together comprise a constant on time signal generator. And the feedback loop, the comparator U2, and the constant on time signal generator further together comprise a control circuit of the converter circuit 50.

One in relevant art may understand that the function of minimum off time circuit U3 is to prevent the noise and the disruption from making converter circuit 50 intermediately enter the next on time period when a previous on time is just over.

One in relevant art may also understand that the minimum off time circuit U3 is not essential. Without the minimum off time circuit U3, the AND gate U4 is also no longer required. In such occasion, the output of comparator U2 is directly coupled to the set terminal of the RS flip-flop U5.

Figure 2:
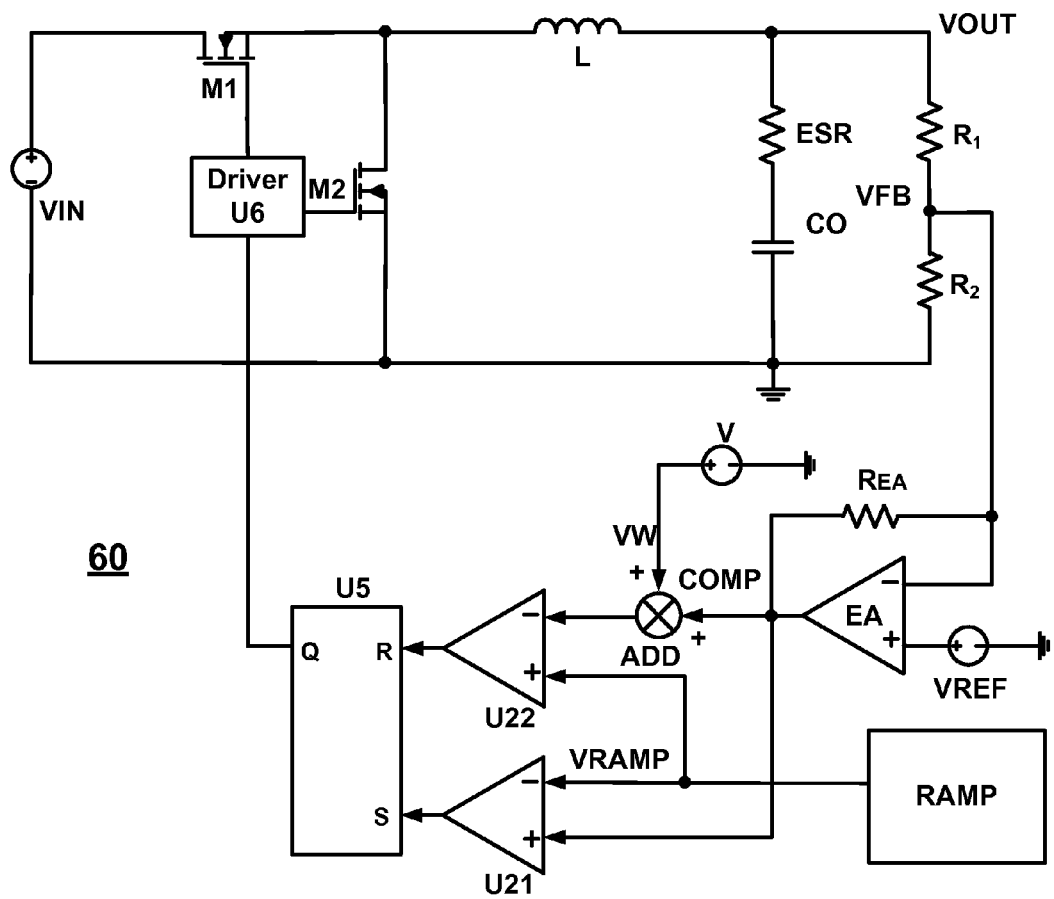
FIG. 2 illustrates a schematic circuitry diagram of a converter circuit 60 according to an embodiment of the present invention.

FIG. 2 illustrates a schematic circuitry diagram of a converter circuit 60 according to an embodiment of the present invention. Converter circuit 60 incorporates some features of converter circuit 50, and these features will not be referred to in explaining converter circuit 60.

The control circuit of converter circuit 60 is different from the control circuit of converter circuit 50. Specifically, the control circuit of converter 60 further comprises an error amplifier EA, an adder ADD, a ramp signal generator RAMP, and one additional comparator. Besides, a control signal generator comprising the RS flip-flop U5 is applied instead of the constant on time signal generator. Therefore the on time of converter circuit 60 is no longer constant. One in relevant art may understand that in certain embodiments, other suitable logic devices may be applied to replace RS flip-flop U5 for obtaining the same function in the control signal generator.

More specifically, an inverting input of error amplifier EA receives the feedback signal VFB, and a non-inverting input of error amplifier EA receives the reference signal VREF. An output of EA provides an error signal COMP to an input of the adder ADD, and to a non-inverting input of a first comparator U21. The other input of the adder ADD is coupled to a DC voltage source V to receive an offset voltage VW. An output of the adder ADD is coupled to an inverting input of a second comparator U22. A non-inverting input of the second comparator U22 and the inverting input of the first comparator U21 are together coupled to the ramp signal generator RAMP to receive the ramp signal VRAMP. Thus, the second comparator compares the sum of error signal COMP and the offset voltage VW with the ramp signal VRAMP. While the first comparator compares the error signal COMP with the ramp signal VRAMP. An output of the first comparator U21 is coupled to the set terminal of the RS flip-flop U5, and an output of the second comparator U22 is coupled to the reset terminal of the RS flip-flop U5. The output Q of the RS flip-flop U5 is coupled to the input of the driver circuit U6. Furthermore, as well-known by these skilled in relevant art, the error amplifier EA also comprises a resistor REA which is coupled between the inverting input and the output of the error amplifier EA.

When the ramp signal VRAMP is lower than the error signal COMP, a first comparing signal from the output of first comparator U21 steps up to high level. The RS flip-flop U5 is set and the voltage level of output Q is high. Through the driver circuit U6, this high level output Q turns on the high side switch M1 and turns off the low side switch M2.

During the on time of converter circuit 60, the ramp signal is rising. The speed of rising, in other word the rising slope of the ramp signal VRAMP, is proportional to the output voltage VOUT and inversely proportional to the input voltage VIN of the converter circuit 60. One skilled in relevant art may understand that the rising slope of ramp signal VRAMP may relate to other parameters. Further, in other embodiments, the rising slope of ramp signal VRAMP may be proportional to the output voltage VOUT of the converter circuit 60 only, but no longer relates to the input voltage VIN.

Once the ramp signal VRAMP reaches to the error signal COMP, the first comparing signal from the first comparator U21 steps down to low level. The voltage level on set terminal S of the RS flip-flop U5 also flops to low level. The voltage level of output Q of U5 is maintained. And therefore the high side switch M1 of converter circuit 60 keeps on, and the low side switch M2 keeps off.

As the ramp signal VRAMP is continuously rising up, it is finally higher that the sum of the error signal COMP and the offset voltage VW. At this time, the second comparing signal from the second comparator U22 step up to high level. Then the RS flip-flop U5 is reset and the output Q of RS flip-flop U5 is turned to low level. Through the driver circuit U6, this low level output Q turns off the high side switch M1 and turns on the low side switch M2. The converter circuit 60 enters into off time.

During the off time, the ramp signal VRAMP is gradually declining down. The speed of declining, in other word, the absolute value of the declining slope of the ramp signal VRAMP, is proportional to the amplitude of the error signal COMP.

When the ramp signal VRAMP flops down to a level lower than the sum of the error signal COMP and the offset voltage VW, the second comparing signal from the second comparator U22 steps down. The voltage level on the reset terminal of the RS flip-flop U5 declines to low level. The output Q of U5 is maintained to low level. Thus in the converter circuit 60, the high side switch M1 keeps off and the low side switch M2 keeps off.

As the ramp signal VRAMP is continuously declining down, it is finally lower than the error signal COMP. At this time, the first comparing signal from the first comparator U21 steps up. The RS flip-flop U5 is set, and the output Q turns to high level. Through the driver circuit U6, this high level Q output turns on the high side switch M1 and turns off the low side switch M2. Thus the converter circuit 60 enters into a next operational cycle.

According to the above text, the on time of the converter circuit 60 TON=VW/RUP, wherein RUP is the rising slope of the ramp signal VRAMP. As described above, in one embodiment, the rising slope of the ramp signal VRAMP is proportional to the output voltage VOUT and is inversely proportional to the input voltage VIN of the converter circuit 60. Consequently, the on time TON is inversely proportional to the output voltage VOUT and proportional to the input voltage VIN. Meanwhile, the off time of the converter circuit 60 TOFF=VW/RDOWN, wherein RDOWN is the absolute value of the declining slope of the ramp signal VRAMP. As described above, the absolute value of the declining slope of the ramp signal VRAMP is proportional to the amplitude of the error signal COMP. So the off time TOFF is reversely proportional to the amplitude of the error signal COMP. The larger amplitude the error signal COMP is, the shorter the off time TOFF is.

Figure 3:
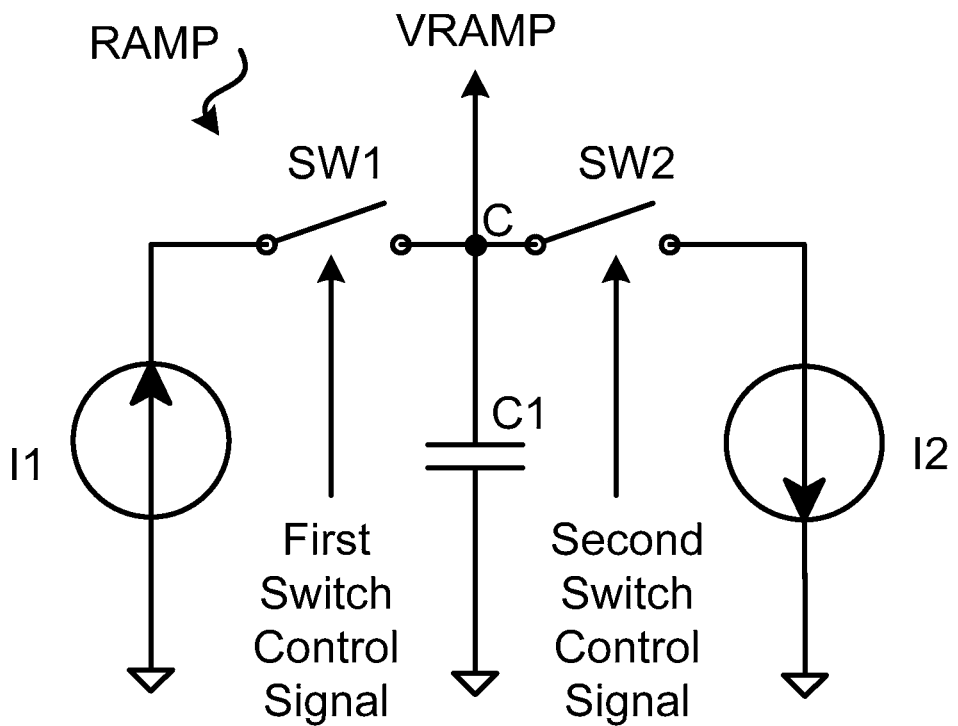
FIG. 3 illustrates a schematic circuitry diagram of the ramp signal generator RAMP shown in FIG. 2 according to an embodiment of the present invention.

FIG. 3 illustrates a schematic circuitry diagram of the ramp signal generator RAMP shown in FIG. 2 according to an embodiment of the present invention.

Figure 4:
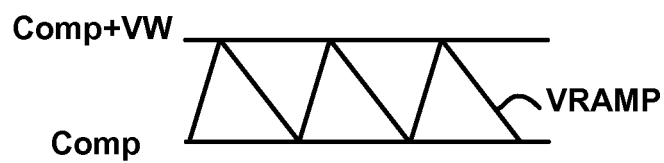
FIG. 4 illustrates a waveform diagram of the ramp signal VRAMP shown in FIG. 2 according to an embodiment of the present invention.

FIG. 4 illustrates a waveform diagram of the ramp signal VRAMP shown in FIG. 2 according to an embodiment of the present invention.

As shown in FIG. 3, the ramp signal generator RAMP comprises a first current source I1, a first switch SW1, a first capacitor C1, a second switch SW2, and a second current source I2. Wherein, a negative end of the first current source I1 is coupled to the reference ground, and a positive end of the first current source I1 is coupled to a first end of the first switch SW1. A second end of the first switch SW1 is coupled to a first end of the second switch SW2 at a conjunction node C. A control end of the switch SW1 is coupled to a first switch control signal. When the ramp signal VRAMP is lower than the error signal, the first switch control signal turns the first switch on and maintains until the ramp signal VRAMP is higher than the sum of the error signal COMP and the offset voltage VW. In one embodiment, the control end of the first switch SW1 is coupled to the output Q of the RS flip-flop U5 to receive the first switch control signal. When the voltage level of the output Q is high, the first switch SW1 is ON, and when the voltage level of the output Q is low, the first switch SW1 is OFF.

A second end of the second switch SW2 is coupled to the negative end of the second current source I2. A control end of the second switch SW2 is coupled to a second switch control signal. When the ramp signal VRAMP is higher than the sum of the error signal COMP and the offset voltage VW, the second switch control signal turns the second switch SW2 on and maintains on until the ramp signal VRAMP is smaller than the error signal COMP. In one embodiment, the control end of the second switch SW2 is coupled to an inverse output $\overline{Q}$ of the RS flip-flop U5. When the voltage level of output Q is low, the second switch SW2 is ON, and when the voltage level of the output Q is high, the second switch SW2 is OFF.

A positive end of second current source I2 is coupled to the reference ground. The first capacitor C1 is coupled between the conjunction node C and the reference ground. The conjunction node C is also applied as the output of the ramp signal VRAMP. The output current of the first current source is proportional to the output voltage VOUT of the converter circuit 60, and inversely proportional to the input voltage VIN. The output current of the second current source is proportional to the amplitude of the error signal COMP.

When the ramp signal VRAMP is lower than the error signal COMP, as described above, the voltage level of output Q of the RS flip-flop is high, and the voltage level of inverse output $\overline{Q}$ is low. The first switch is ON and the second switch is OFF. The first current begins charging the first capacitor C1. The charging slope of the voltage across the first capacitor C1 is Ii1/Cc1, wherein Ii1 is the output current of the first current source I1, and Cc1 is the capacitance of the first capacitor C1. As being charged, the voltage across the first capacitor C1 is gradually increasing. The increasing speed, in other word the rising slope of the ramp signal VRAMP, is proportional to the charging slope Ii1/Cc1.

Since the output current Ii1 is proportional to the output voltage VOUT of the converter circuit 60, and inversely proportional to the input voltage VIN, the rising slope of the ramp signal VRAMP is proportional to the output voltage VOUT and inversely proportional to the input voltage VIN.

When the ramp signal VRAMP is larger than the sum of the error signal COMP and the offset voltage VW, as described above, the voltage level of the output Q of the RS flip-flop U5 is low, while the voltage level of the inverse output $\overline{Q}$ of RS flip-flop is high. Thus the first switch SW1 is OFF and the second switch SW2 is ON. The second current source I2 begins discharging the first capacitor C1. The discharging slope of the voltage across the capacitor C1 is Ii2/Cc1, wherein Ii2 is the output current of the second current source I2. As being discharged, the voltage across the capacitor C1, in other word the ramp signal VRAMP, is gradually declining down. The speed of declining, which means the absolute value of the declining slope, is proportional to the discharging slope Ii2/Cc1.

Since the output current of the second current source I2 is proportional to the error signal COMP, the declining slope of the ramp signal VRAMP is proportional to the error signal COMP.

As shown in FIG. 4, the amplitude of the ramp signal VRAMP fluctuates from COMP to COMP+VW. Once the amplitude of the ramp signal VRAMP declines down to a level lower than the error signal COMP, it begins rising up. And once it rises up to a level higher than the sum of the error signal COMP and the offset voltage VW, it begins declining again.

As described above, the declining slope of the ramp signal VRAMP is proportional to the error signal COMP. The larger the error signal COMP is, the faster the ramp signal declines down to a level lower than the error signal COMP, so that the on time may come earlier. As a result, the switch M1 is turned on earlier, and the output voltage VOUT rises up faster to result in the feedback signal VFB approaching the reference signal VREF more quickly.

Meanwhile, the rising slope of the ramp signal VRAMP is proportional to the output voltage VOUT of the converter circuit 60, and inversely proportional to the input voltage VIN. Once the output voltage VOUT is continuously declining down, and the error signal keeps increasing, the rising slope of the ramp signal VRAMP is continuously decreasing. Thus the time for the ramp signal VRAMP approaching the sum of the error signal COMP and the offset voltage VW is prolonged, and the on-time of the converter circuit 60 is also prolonged. As the high side switch M1 keeps on for a longer time, the feedback signal VFB approaches the reference signal VREF more quickly.

Figure 5:
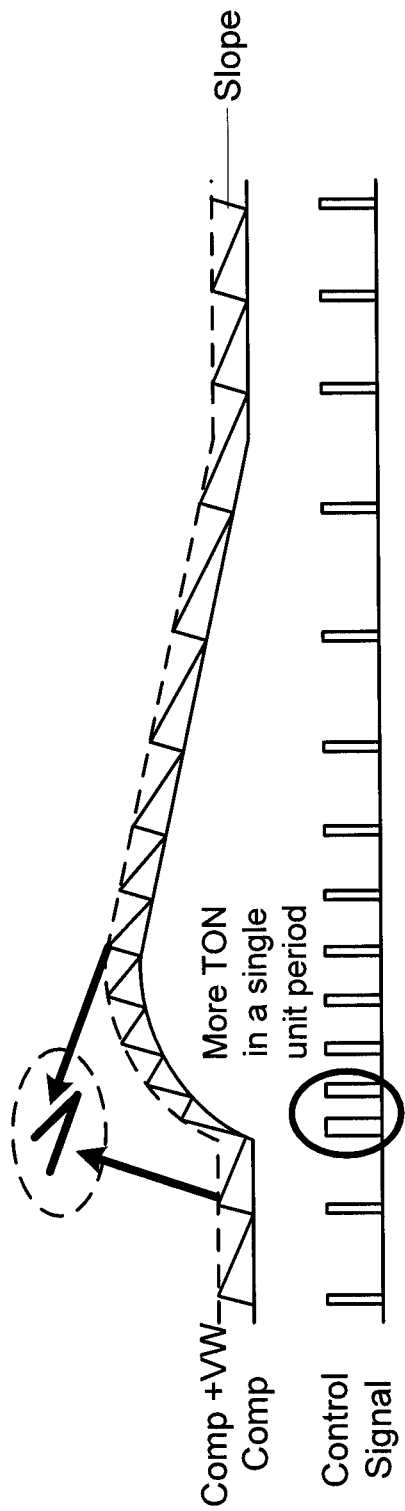
FIG. 5 illustrates a waveform diagram to indicate the control signal responding from the ramp signal VRAMP in the DC-DC converter circuit 60 according to an embodiment of the present invention.

FIG. 5 illustrates a waveform diagram to indicate the control signal responding from the ramp signal VRAMP in the DC-DC converter circuit 60 according to an embodiment of the present invention. As shown in FIG. 5, the upper portion of the diagram illustrates the change of the rising slope and the declining slope of the ramp signal VRAMP, and the lower portion of the diagram illustrates the corresponding generated on-time of the converter circuit 60. It is indicated that the faster the ramp signal VRAMP declines down, the earlier the on-time is generated. The slower the ramp signal rises up, the longer the on-time lasts.

According to the above analysis, it shows that the performance of the transient response of the presented embodiment is excellent. When a load is coupled into the converter circuit, the output voltage VOUT and also the feedback signal VFB step down, so that the amplitude of the error signal COMP gets larger, which will make the on time come earlier. The operational frequency of the high side switch of the converter circuit 60 is correspondingly increases to provide more energy to the load in an unit-time. Thus the output voltage VOUT quickly returns to steady state. In additional, the step down of the output voltage VOUT also makes the on time of the converter circuit lasts longer. This effect also helps to provide more energy to the load in a single unit time and to make the output voltage VOUT return to steady state quickly.

Moreover, inasmuch as the utilizing of error amplifier, the stability issue existing in prior art constant on time converter circuit is also solved.

Figure 6:
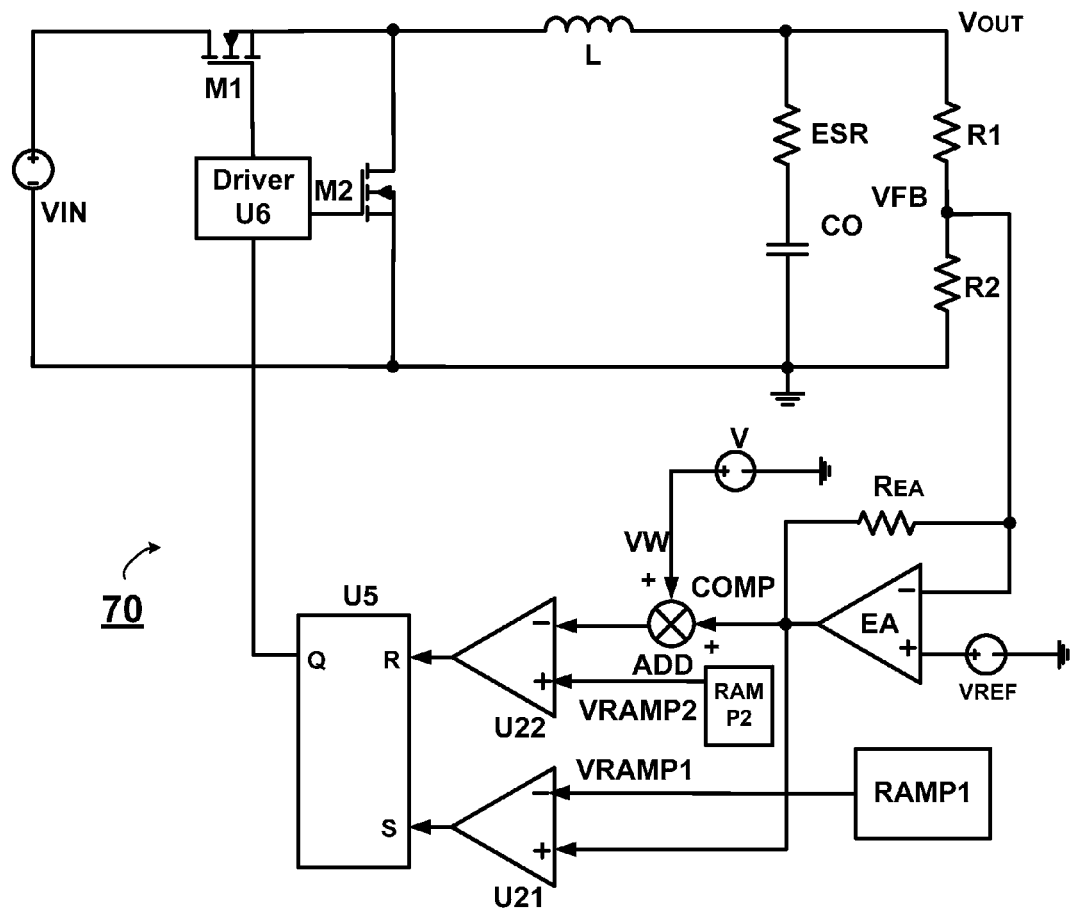
FIG. 6 illustrates another converter circuit 70 according to another embodiment of the present invention.

FIG. 6 illustrates another DC-DC converter circuit 70 according to another embodiment of the present invention. The primary difference between the converter circuit 70 and the converter circuit 60 is that two ramp signal generator RAMP1 and RAMP2 are adopted to replace the ramp signal generator RAMP.

Wherein, a first ramp signal generator RAMP1 generates a first ramp signal VRAMP1 and provides it to the inverting input of the first comparator U21. And a second ramp signal generator RAMP2 generates a second ramp signal VRAMP2 and provides it to the non-inverting input of the second comparator U22.

When the first ramp signal VRAMP1 is lower than the error signal COMP, the first comparing signal from first comparator U21 steps up to high level. The RS flip-flop U5 is set, and the voltage level of the output Q is high. This high level output Q turns on the high side switch M1 and turns off the low side switch M2 through the driver circuit U6.

Once the first ramp signal VRAMP1 is lower than the error signal COMP, the first ramp signal VRAMP1 is pulled up to the level equaling the sum of the error signal COMP and the offset voltage VW. Then the first ramp signal gradually declines down. The declining slope of the first ramp signal is proportional to the amplitude of the error signal COMP.

As the stepping up of the first ramp signal VRAMP1, it becomes higher than the error signal COMP. Thus the first comparing signal from first comparator U21 steps down to low level, and the voltage level on the set terminal S of the RS flip-flop U5 declines to low level. The output Q of U5 is maintained so that the high side switch M1 keeps on and the low side switch M2 keeps off.

As the first ramp signal VRAMP1 is pulled up, the second ramp signal VRAMP2 simultaneously begins to rising gradually. When the second ramp signal VRAMP2 reaches the sum of the error signal COMP and the offset voltage VW, the second comparing signal from the second comparator U22 steps up. Thus the RS flip-flop U5 is reset, so that the voltage level of the output Q is turned to low. Through the driver circuit U6, this low level output Q turns off the high side switch M1 and turns on the low side switch M2.

When the second ramp signal VRAMP2 is higher than the sum of the error signal COMP and the offset voltage VW, it is pushed down to the level equaling the error signal COMP and is maintained until the next time when the first ramp signal VRAMP1 is pulled up to the level equaling the sum of the error signal COMP and the offset voltage VW. The rising slope of the second ramp signal is proportional to the output voltage VOUT and inversely proportional to the input voltage VIN.

As the second ramp signal VRAMP2 is pushed down, the second comparing signal from the second comparator U22 steps down to low level. Then the voltage level on set terminal of the RS flip-flop U5 turns to low level. The output Q is maintained, so the high side switch M1 keeps ON and the low side switch keeps OFF.

Then the first ramp signal VRAMP1 is continuously declining down. When the first ramp signal VRAMP1 is lower than the error signal COMP, the first comparing signal from the first comparator U21 steps up to high level. The RS flip-flop is set and the output Q is turned to high level. Thus the high level output Q turns on the high side switch M1 turns off the low side switch M2. The converter circuit 70 enters into next operational cycle.

Figure 7A:
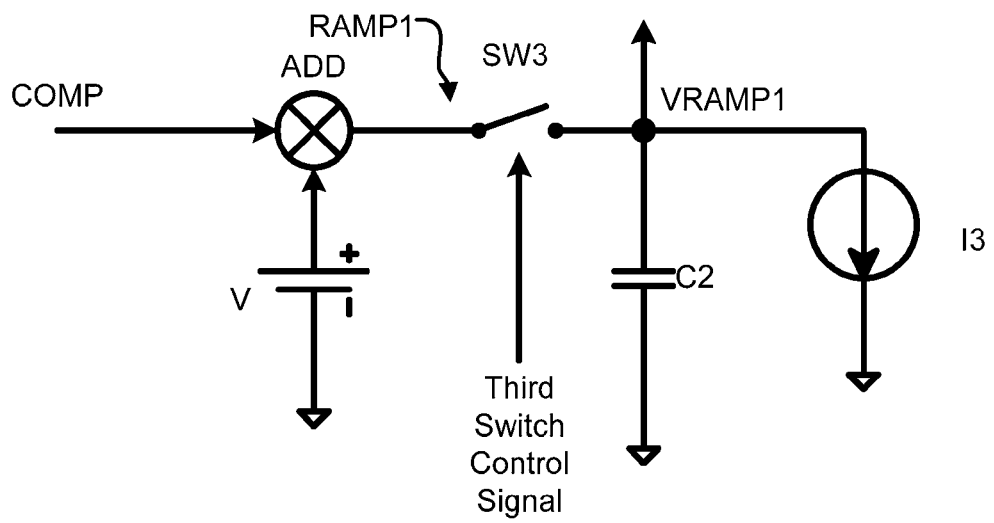
FIG. 7A and FIG. 7B respectively illustrate a schematic circuitry of a first generator RAMP1 and a second generator RAMP2 in converter circuit 70 according to another embodiment of the present invention.
Figure 7B:
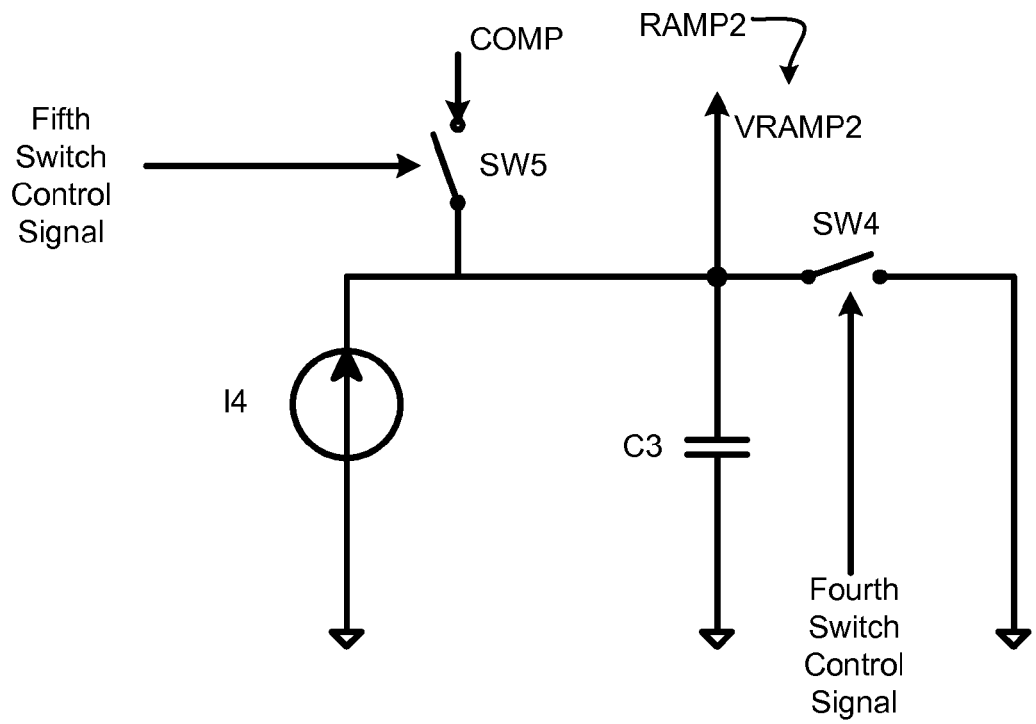

FIG. 7A and FIG. 7B respectively illustrate a schematic circuitry of a first ramp signal generator RAMP1 and a second ramp signal generator RAMP2 in DC-DC converter circuit 70 according to another embodiment of the present invention.

Figure 8A:
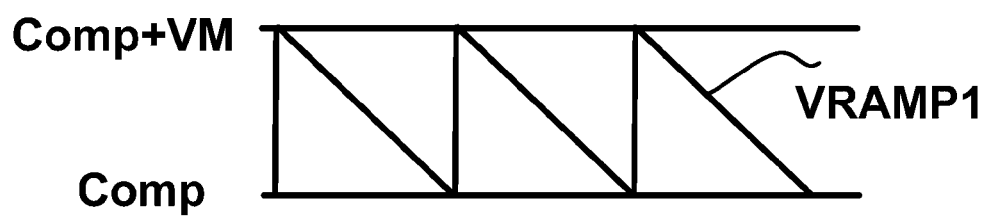
FIG. 8A and FIG. 8B respectively illustrate the waveform diagrams of the first ramp signal VRAMP1 and the second ramp signal VRAMP2 according to another embodiment of the present invention.
Figure 8B:
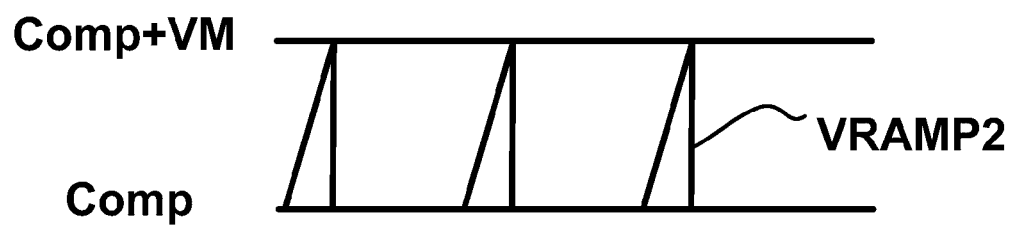

FIG. 8A and FIG. 8B respectively illustrate the waveform diagrams of the first ramp signal VRAMP1 and the second ramp signal VRAMP2 according to another embodiment of the present invention.

As shown in FIG. 7A, the first ramp signal generator RAMP1 comprises the offset voltage source V, an adder ADD, a third switch SW3, a second capacitor C2 and a third current source I3.

Wherein, the inputs of the adder ADD are respectively coupled to the output of the error amplifier EA and a positive end of the offset voltage source V, and the output of the adder ADD is coupled to a first end of the third switch SW3. A second end of the third switch SW3 is coupled to a negative end of the third current source I3. A negative end of the voltage source V and a positive end of the third current source I3 is connected to the reference ground. The second capacitor C2 is coupled between the second end of the third switch SW3 and the reference ground. A control end of the third switch SW3 receives a third switch control signal. When the first ramp signal is lower than the error signal COMP, the third switch control signal turns the third switch SW3 on. The on time of the third switch SW3, defined as a first period, is relatively short, for example, 30 ns. In one embodiment, the on time of the third switch may be constant. The second end of the third switch SW3 is utilized as the output of the first ramp signal generator RAMP1, configured to provide the first ramp signal VRAMP1. Wherein, the output current of the third current source I3 is proportional to the amplitude of the error signal COMP.

When the first ramp signal VRAMP1 is lower than the error signal COMP, the third switch SW3 is turned on according to the third switch control signal. The first ramp signal VRAMP1 is immediately pulled up to the level equaling to the amplitude of the output of the adder ADD which is the sum of the error signal COMP and the offset voltage VW. Hence, once the third switch is turned on, the voltage across the second capacitor C2 is immediately pull up to the sum of the error signal COMP and the offset voltage VW.

Controlled by the third switch control signal, the third switch SW3 is turned off after being on for a first period, e.g. 30 ns. The third current source I3 begins to discharging the second capacitor. The discharging speed, meaning the slope of the discharging, is Ii3/Cc2, wherein Ii3 is the output current of the third current source, and Cc2 is the capacitance of the capacitor C2. As the discharging continues, the voltage across the capacitor C2, meaning the first ramp signal VRAMP1 gradually declines down. The declining slope is proportional to the discharging slope Ii3/Cc2.

Since the output current of the third current source I3 is proportional to the amplitude of the error signal COMP, the declining slope of the first ramp signal is proportional to the amplitude of the error signal COMP.

As shown in FIG. 7B, the second ramp signal generator RAMP2 comprises a fourth current source I4, a fourth switch SW4, a fifth switch SW5 and a third capacitor C3.

Wherein, an output of the fourth current source I4 is coupled to a first end of the fifth switch SW5, a first end of the fourth switch SW4, and a first end of the third capacitor C3. The output of the fourth current source I4 is also utilized as the output of the second ramp signal generator RAMP2 to provide the second ramp signal VRAMP2. A negative end of the fourth current source, a second end of the fourth switch SW4, and a second end of the capacitor C3 are connected to reference ground. A second end of the fifth switch receives the error signal COMP. Control ends of the fourth switch SW4 and the fifth switch SW5 are coupled to a fourth switch control signal. When the second ramp signal VRAMP2 is higher than the sum of the error signal COMP and the offset voltage VW, the fourth switch control signal turns off the fourth switch SW4 and the fifth switch SW5 until the first ramp signal VRAMP1 is lower than the error signal COMP. In one embodiment, the control ends of the fourth switch SW4 and the fifth switch SW5 are coupled to the inverse output $\overline{Q}$ of the RS flip-flop U5. When the output Q of the RS flip-flop is low, the fourth switch SW4 and the fifth switch SW5 are turned on. And when the output Q is high, the fourth switch SW4 and the fifth switch SW5 are turned off. Wherein, the output current of the fourth current source is proportional to the output voltage VOUT and inversely proportional to the input voltage VIN Once the output Q of the RS flip-flop U5 is high, the switches SW4 and SW5 are turned off. The fourth current source I4 begins charging the third capacitor C3. The charging slope is Ii4/Cc3, wherein Ii4 is the output current of the fourth current source, and Cc3 is the capacitance of the capacitor C3. As the charging continues, the voltage across the capacitor C3, meaning the second ramp signal VRAMP2, gradually rises up. The rising slope is proportional to the charging slope Ii4/Cc3.

Since the output current of the fourth current source is proportional to the output voltage VOUT and inversely proportional to the input voltage VIN, the rising slope of the second ramp signal VRAMP2 is also proportional to the output voltage VOUT and inversely proportional to the input voltage VIN.

When the second ramp signal VRAMP2 is higher than sum of the error signal COMP and the offset voltage VW, as described above, the second comparing signal from the second comparator U22 steps up to a high level. The RS flip-flop U5 is reset, and the output Q is low. The switches SW4 and SW5 are turned on. The voltage across the capacitor C3, meaning the second ramp signal VRAMP2, is pushed down to the level equaling the amplitude of the error signal COMP. Until the first ramp signal VRAMP1 is lower than the error signal COMP, and the first comparator U21 generates a high level comparing signal, the output Q of the RS flip-flop could be turned to high again. The switches SW4 and SW5 are turned off and the second ramp signal VRAMP2 gradually rises up.

Seen in FIG. 8A, the amplitude of the first ramp signal VRAMP1 gradually declines down from the sum of error signal COMP and the offset voltage VW. If the first ramp signal VRAMP1 is lower than the error signal COMP, it will be immediately pulled up to the sum of error signal COMP and the offset voltage VW again, and once more begins declining down. Wherein the declining slope of the first ramp signal RAMP1 is proportional to the amplitude of the error signal COMP.

As shown in FIG. 8B, the amplitude of the second ramp signal VRAMP2 gradually rises up from the error signal COMP. Once it rises above the sum of the error signal COMP and the offset voltage VW, it is immediately pushed down to the level of the error signal COMP and maintained at this level until the first ramp signal VRAMP1 gradually declines to a level lower than the error signal COMP. Then the second ramp signal VRAMP2 rises up again. Wherein, the rising slope of the second ramp signal VRAMP2 is proportional to the output voltage VOUT and reversely proportional to the input voltage VIN.

Compared with the converter circuit 60 shown in FIG. 2, the converter circuit 70 in FIG. 6 may obtain a better transient response performance. For example, when the load current is step up, if the declining slopes of VRAMP and VRAMP1 are the same, and if the rising slopes of the VRAMP and VRAMP2 are the same, the off time of the converter circuit 70 is shorter than the converter circuit 60. It means that the converter circuit 70 may turns on the high side switch and turns off the low side switch more quickly than the converter circuit 60, so that the feedback signal VFB of the converter circuit 70 also increases to approach the reference signal VREF more quickly. The reasons of the better transient response performance for converter circuit 70 may comprises that once the second ramp signal VRAMP2 rises from the error signal COMP, the first ramp signal VRAMP1 declines from the sum of the error signal COMP and the offset voltage VW. The off time TOFF is changed from VW/RDOWN of the converter circuit 60 to VW/RDOWN-VW/RUP of the converter circuit 70, which is reduced for VW/RUP.

Figure 9:
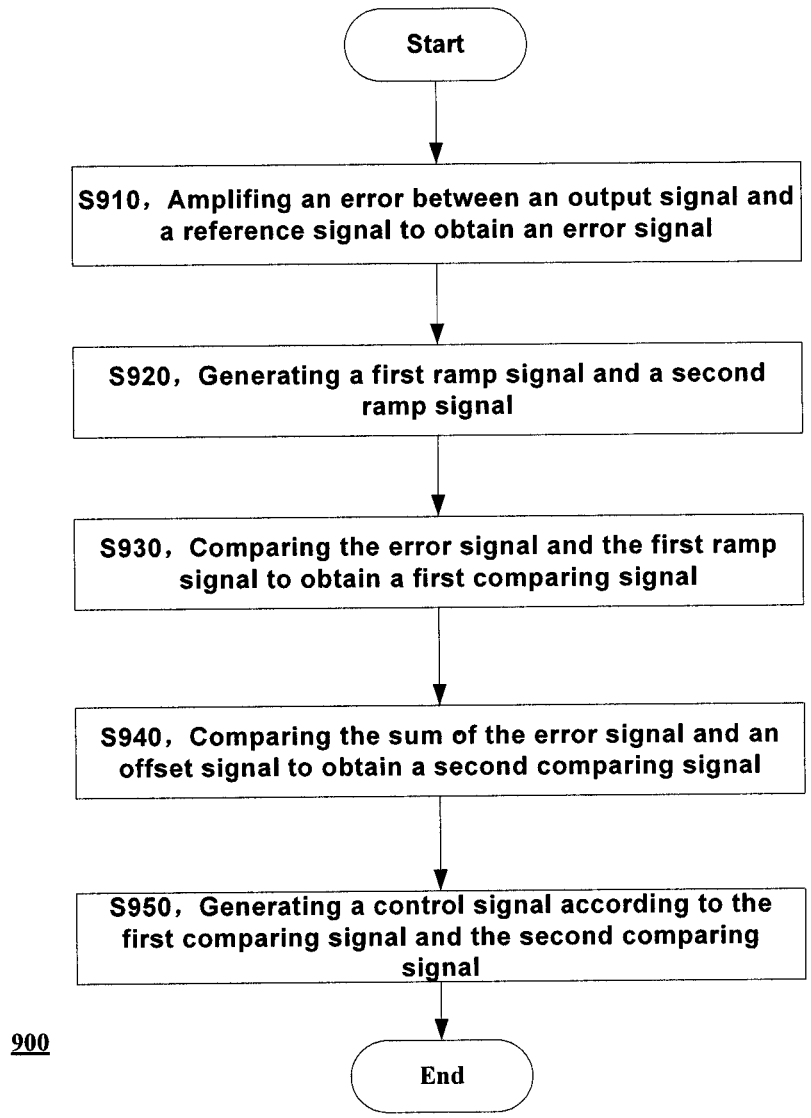
FIG. 9 illustrates a flowchart diagram of a method for controlling a converter circuit according to an embodiment of the present invention.

FIG. 9 illustrates a flowchart diagram of a method 900 for controlling a DC-DC converter according to an embodiment of the present invention.

Seen in FIG. 9, the method 900 comprises: step S910, amplifying an error between an output voltage or a feedback output voltage of the converter circuit, and a reference signal, configured to obtain an error signal; step 920, generating a first ramp signal and a second ramp signal; step 930, comparing the error signal with the first ramp signal to obtain a first comparing signal; step S940, comparing the sum of the error signal and a offset voltage with the second ramp signal to obtain a second comparing signal; and step S950, generating a control signal to control switches of the converter circuit according to the first comparing signal and the second comparing signal.

In one embodiment, the switches of the converter circuit comprises a high side switch and a low side switch, when the first ramp signal is lower than the error signal, a high level first comparing signal is generated to make the control signal generate an on time of the converter circuit, wherein during the on time, the high side switch is turned on and the low side switch is turned off; when the second ramp signal is higher than the sum of the error signal and the offset voltage, a low level second comparing signal is generated to make the control signal generates an off time of the converter circuit, wherein during the off time, the high side switch is turned off and the low side switch is turned on.

In one embodiment, the first ramp signal and the second ramp signal are identical ramp signals.

In one embodiment, wherein, the ramp signal comprises the following features: rising up gradually if the ramp signal is lower than the error signal; declining down gradually if the ramp signal is higher than the sum of the error signal and the reference signal; wherein the declining slope of the ramp signal is proportional to the error signal, and wherein the rising slope of the ramp signal is proportional to the output voltage of the converter circuit and inversely proportional to an input voltage of the converter circuit.

In another embodiment, the first ramp signal and the second ramp signal may be different from each other.

wherein, the first ramp signal is pulled up to a level equaling the sum of the error signal and the offset voltage if it is lower than the error signal, and then gradually declines down from this level, wherein the declining slope of the first ramp signal is proportional to the error signal.

And wherein, the second ramp signal is pushed down to a level equaling the error signal if it is higher than the sum of the error signal and the offset voltage, and then gradually rises up from this level, wherein the rising slope is proportional to the output voltage of the converter circuit and inversely proportional to the input voltage of the converter circuit.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A converter circuit for converting an input voltage to an output voltage, comprising:
   an error amplifier, coupled to the output voltage or a feedback output signal of the output voltage, and a reference signal, operable to generate an error signal accordingly;
   a ramp signal generator, generating a first ramp signal and a second ramp signal, wherein the absolute value of a declining slope of the first ramp signal is proportional to an amplitude of the error signal, and wherein a rising slope of the second ramp signal is proportional to the output voltage;
   a first comparator, coupled to the error signal and the first ramp signal, operable to generate a first comparing signal accordingly, wherein the first comparing signal is configured to turn on the converter circuit when the first ramp signal is lower than the error signal, and wherein an on time of the converter is reversely proportional to the rising slope of the second ramp signal;
   an adder having a first input terminal, a second input terminal and an output terminal, the first input terminal is configured to receive the error signal, the second input terminal is configured to receive an offset voltage, the adder is configured to add the error signal and the offset voltage to generate a sum signal, and wherein the offset voltage is provided by a DC voltage source, and wherein the DC voltage source has a negative terminal and a positive terminal, the negative terminal is connected to ground, the positive terminal is connected to the second input terminal of the adder to provide a constant DC voltage signal as the offset voltage;
   a second comparator, coupled to the sum signal and coupled to the second ramp signal, operable to generate a second comparing signal accordingly, wherein the second comparing signal is configured to turn off the converter circuit when the second ramp signal is higher than the sum signal, and wherein an off time of the converter is reversely proportional to the declining slope of the first ramp signal; and
   a control signal generator, coupled to the first comparing signal and the second comparing signal, operable to generate a control signal to turn switches in the converter circuit ON and OFF accordingly.

2. The converter circuit according to claim 1, wherein the switches in the converter circuit comprise a high side switch and a low side switch.

3. The converter circuit according to claim 2, wherein
   during the on time of the converter circuit, the high side switch is turned on and the low side switch is turned off; and
   during the off time of the converter circuit, the high side switch is turned off and the low side switch is turned on.

4. The converter circuit according to claim 1, wherein the control signal generator is an RS flip-flop, wherein a set end of the RS flip-flop is configured to receive the first comparing signal, and wherein a reset end of the RS flip-flop is configured to receive the second comparing signal, and further wherein a Q output end of the RS flip-flop is configured to provide the control signal.

5. The converter circuit according to claim 1, wherein the ramp signal generator comprises a first generator and a second generator, wherein the first generator is configured to generate the first ramp signal and wherein the second generator is configured to generate the second ramp signal.

6. The converter circuit according to claim 5, wherein the first generator comprising:
an offset voltage source, configured to generate an offset voltage;
an adder, having two inputs which are coupled to the error signal and the offset voltage respectively;
a first switch, having a first end, a second end and a control end, wherein the first end is coupled to an output of the adder, and wherein the control end is coupled to a first switch control signal;
a first current source, configured to generate an first current, the first current source having a positive end and a negative end, wherein the negative end is coupled to the second end of the first switch and wherein the positive end is connected to the reference ground; and
a first capacitor, having a first end and a second end, wherein the first end is coupled to the second end of the first switch and wherein the second end is coupled to the reference ground;
wherein the first current is proportional to the error signal, and wherein the first ramp signal is generated on the second end of the first switch.

7. The converter circuit according to claim 6, wherein the first switch is turned on when the first ramp signal is lower than the error signal, and wherein the first switch is then turned off after a first period.

8. The converter circuit according to claim 5, wherein the second generator comprising:
a second current source, configured to generate a second current, the second current source having a positive end and a negative end, wherein the negative end is connected to the reference ground;
a second switch, having a first end, a second end and a control end, wherein the first end is coupled to the positive end of the second current source, and wherein the second end is coupled to the reference ground, and further wherein the control end is coupled to a second switch control signal;
a third switch, having a first end, a second end and a control end, wherein the first end is coupled to the positive end of the second current source, and wherein the second end is coupled to the error signal, and further wherein the control end is coupled to the second switch control signal; and
a second capacitor, having a first end and a second end, wherein the first end is coupled to the positive end of the second current source, and wherein the second end is connected to the reference ground;
wherein the second current is proportional to the output voltage of the converter circuit, and the second current is inversely proportional to the input voltage of the converter circuit, and wherein the second ramp signal is generated on the positive end of the second current source.

9. The converter circuit according to claim 8, wherein the second switch and the third switch are turned on when the second ramp signal is higher than the sum of the error signal and the offset voltage, and wherein the second switch and the third switch are turned off when the first ramp signal is lower than the error signal.

10. A method for controlling a converter circuit, comprising:
amplifying an error between an output voltage of the converter circuit or a feedback output voltage of the converter circuit, and a reference signal, and obtaining an error signal;
generating a first ramp signal and a second ramp signal, wherein the absolute value of a declining slope of the first ramp signal is proportional to an amplitude of the error signal, and wherein a rising slope of the second ramp signal is proportional to the output voltage;
comparing the error signal with the first ramp signal to obtain a first comparing signal, wherein the first comparing signal turns on the converter circuit when the first ramp signal is lower than the error signal, and wherein an on time of the converter is reversely proportional to the rising slope of the second ramp signal;
comparing a sum of the error signal and an offset voltage with the second ramp signal to obtain a second comparing signal, wherein the second comparing signal turns off the converter circuit when the second ramp signal is higher than the sum of the error signal and the offset voltage, and wherein an off time of the converter is reversely proportional to the declining slope of the first ramp signal, and wherein the offset voltage is provided by a DC voltage source, and wherein the DC voltage source has a positive terminal and a negative terminal, and wherein the negative terminal is connected to ground, and wherein the DC voltage source is configured to provide a constant DC voltage signal as the offset voltage at the positive terminal; and
generating a control signal to control switches of the converter circuit according to the first comparing signal and the second comparing signal.

11. The method according to claim 10, wherein the switches of the converter circuit comprise a high side switch and a low side switch.

12. The method according to claim 10, wherein:
comparing the error signal with the first ramp signal to obtain a first comparing signal comprises generating a high level first comparing signal when the first ramp signal is lower than the error signal; and
comparing the sum of the error signal and an offset voltage with the second ramp signal to obtain a second comparing signal comprises generating a low level second comparing signal when the second ramp signal is higher than the sum of the error signal and the offset voltage.

13. The method according to claim 10, further comprising:
pulling up the first ramp signal to a level equaling the sum of the error signal and the offset voltage if the first ramp signal is lower than the error signal; and
declining the first ramp signal gradually from the level equaling the sum of the error signal and the offset voltage;
wherein a declining slope of the first ramp signal is proportional to the error signal.

14. The method according to claim 10, further comprising:
pushing down the second ramp signal to a level equaling the error signal if it is higher than the sum of the error signal and the offset voltage; and
raising the second ramp signal gradually from the level equaling the error signal;
wherein a rising slope of the second ramp signal is proportional to the output voltage of the converter circuit and inversely proportional to the input voltage of the converter circuit.

* * * * *